United States Patent [19]

Graves

[11]  3,853,676

[45]  Dec. 10, 1974

[54] REFERENCE POINTS ON FILMS CONTAINING CURVED CONFIGURATIONS OF MAGNETICALLY ORIENTED PIGMENT

[75] Inventor: Irving S. Graves, Media, Pa.

[73] Assignee: E. I. du Pont de Nemours and Company, Wilmington, Del.

[22] Filed: Dec. 29, 1972

[21] Appl. No.: 319,757

Related U.S. Application Data

[63] Continuation of Ser. No. 59,679, July 30, 1970.

[52] U.S. Cl.......................... 161/5, 117/31, 117/33, 117/37 R, 117/38, 117/238, 117/239, 161/162, 161/168, 161/413
[51] Int. Cl. ............................................. B44c 3/02
[58] Field of Search ........... 161/168, 162, 413, 3, 5, 161/33, 34; 117/238, 239, 33, 31, 37 R, 38

[56] References Cited
UNITED STATES PATENTS
3,676,273   7/1972   Graves................................ 161/168

Primary Examiner—William J. Van Balen

[57] ABSTRACT

A pigmented film comprising (a) a film of film-forming material, (b) contained in the film magnetically orientable pigment that is orientated in curved configurations, and (c) located in close proximity to the film reference points.

10 Claims, No Drawings

REFERENCE POINTS ON FILMS CONTAINING CURVED CONFIGURATIONS OF MAGNETICALLY ORIENTED PIGMENT

BACKGROUND OF THE INVENTION

This invention relates to films containing magnetically orientable pigment orientated in curved configurations, and having in close proximity to the film reference points. Such films exhibit an extreme illusion of depth.

SUMMARY OF THE INVENTION

According to the present invention there is provided a pigmented film comprising:

a. a film comprised of film-forming material and b. contained in the film 0.1 percent to 95 percent (by weight of the film) of magnetically orientable pigment that is orientated in curved configurations, and c. located in close proximity to the film reference points.

There is also provided by this invention a method of producingg such films which comprises:

a. providing a soft film commprising film-forming material and containing 0.1 percent to 95 percent (by weight of the film-forming material) of magnetically orientable pigment, b. subjecting the soft film to curved magnetic fields, thereby orientating the pigment in curved configurations, c. hardening the film, and d. providing, in close proximity to the film, reference points.

The films of this invention exhibit unique visual effects i.e., films having a patterned configuration therein and exhibiting and extreme illusion of depth.

DESCRIPTION OF THE INVENTION

The Pigments

Suitable pigments are any particles of material that are magnetically orientable, i.e., when placed in a magnetic field will align themselves along the lines of force of the magnetic field. Often such pigments are metallic (the word metallic, for the purpose of this invention, is meant to include metallic oxides). Examples of such metallic pigments include iron, iron alloys, steel, steel alloys, nickel, cobalt, iron oxide, chromium dioxide, etc.

Metallic pigment can also be deposited on or dispersed in nonmagnetically orientable materials to produce a final pigment material that is subject to magnetic orientation. An example of this nickel coated mica flake or particles.

Nonmagnetically orientable pigments such as aluminum, copper, bronze, silver, gold, etc. preferably in flake form, are also suitable when used in combination with a pigment that is magnetically orientable. In these mixed pigments the magnetically orientable pigment and the nonmagnetically orientable pigment should be in intimate contact, although it is not necessary that one type of pigment be coated on the other type. When using such mixed pigments, there should be sufficient magnetically orientable pigment present to render the mixture responsive to the action of a magnetic field. Generally, this means that the total pigment should contain at least 10 percent by weight of the magnetically orientable pigment and preferably 25 percent or more of the magnetically orientable pigment.

Preferred magnetically orientable pigment is nickel, preferably in the form of flakes, needles or plates. Especially preferred is the highly reflective nickel flake* produced by vacuum depositing nickel over a release coated substrate, removing the deposited nickel, and then dividing the nickel to produce flakes of the desired size.

*Such pigment can be produced according to the teaching of U.S. Pat. No. 2,839,378 (with the exception that the flake is made of nickel instead of aluminum) the disclosure of which is hereby incorporated by reference.

While visual effects can be produced with most any magnetically orientable pigment particles, the most desirable effects are produced when the pigment is in the form of flakes, plates or needles.

The concentration of magnetically orientable pigment in the film can vary over wide limits. In general, the magnetically orientable pigment can range from as little as 0.1 percent to as much as 95 percent of the weight of the film. The exact numerical upper limit of the magnetically orientable pigment depends on the visual effect desired and the film-forming material used, and should not be so much that the resulting film has insufficient strength. Often the magnetically orientable pigment will be present in an amount of no more than about 80 percent and under many circumstances no more than about 50 percent, preferably it is present in an amount of from about 0.5 percent to about 25 percent (the foregoing percentages being by weight, based on the weight of the film.

THE FILM-FORMING MATERIAL

The film that contains the magnetically oriented pigment is comprised of any suitable film-forming material.

One type of film-forming material is glass, porcelain, borates, silicates, silica and the like.

Another type of film-forming material is casein, casein derivatives, or other film-forming materials derived from animal or plant protein.

Another type of film-forming material is polymer either natural or synthetic (polymer for the purpose of this invention being meant to include homopolymers and copolymers). Examples of suitable polymers include varnishes, drying oils, allyl resins, epoxy resins, formaldehyde condensation resins (including phenolic, urea melamine and the like), polyurethanes, polyesters, derivatives of cellulose including cellulose esters, cellulose ethers, nitrocellulose, etc.

Other examples of film-forming polymers include those produced by the addition polymerization of ethylenically unsaturated monomers such as acrylic acid, methacrylic acid, esters of acrylic acid or methacrylic acid formed from alcohols having about 1 to 20 carbon atoms (such as methyl acrylate or methacrylate, ethyl acrylate of methacrylate, propyl acrylate or methacrylate, isopropyl acrylate or methacrylate, the various butyl acrylates or methacrylates, 2-ethylhexyl acrylate or methacrylate, n-hexyl, n-octyl, t-octyl, hexadecyl, or octadecyl acrylates or methacrylates), itaconic acid, fumaric acid, esters of itaconic acid or fumaric acid with alkanols of 1–20 carbon atoms, acrylonitrile, methacrylonitrile, acrylamine, stryrene, butadiene, vinyl chloride, vinyl toluene, maleic anhydride, alkyl acetate, t-butylaminoethyl methacrylate, hydroxyalkyl acrylates and methacrylates, ethylene, propylene, dimethyl or diethyl aminoethyl methacrylate, tetrafluoroethylene, hexafluoropropylene, vinyl fluoride, vinylidene fluoride.

Blends of film-forming materials can also be used.

Preferred films include those comprised of polymers formed from the addition polymerization of ethylenically unsaturated monomers. Especially preferred films comprise polymers of acrylic acid, methacrylic acid, esters of acrylic acid or methacrylic acid with alkanols of about 1–20 carbon atoms, dimethyl or diethyl aminoethyl methacrylate or blends of the foregoing.

The film can contain adjuncts such as plasticizers, fillers, dispersing agents, normal pigment, dyes and the like.

THE REFERENCE POINTS

Reference points are located in close proximity to the film.

The magnetically orientated pigment in the film, aligned in curved configurations, will produce a patterned configuration in the film that appears to be located considerably below the actual thickness of the film. The presence of reference points in close proximity to the film, surprisingly, produces a much stronger illusion of depth in the film.

The reference points can be anything located in the close proximity to the film that can be seen by the naked eye and provides an awareness to the viewer of the location of the film. These reference points include printing, writing, or dusting or splattering of paint on the top surface of the film; providing a textured surface on the film by cutting, scratching, etching, molding or the like; providing a textured surface on the substrate so that a film adhered thereto will have a textured surface; providing a top coat on the film that contains particles visible to the naked eye such as flakes, specks, particles, of pigment or the like; including in or on the film particles, visible to the naked eye (either magnetically orientable or nonmagnetically orientable) such as flakes, specks, particles of pigment or the like; or combinations of the foregoing.

THE PROCESS

A film-forming composition is made up which contains the film-forming material and the magnetically orientable pigment, and if desired adjuncts. The composition can be in the form of a paint wherein the film-forming material is in solution in a suitable liquid media or a paint wherein the film-forming material is dispersed in a suitable liquid media. Or the composition can comprise a film-forming material in melted or soft form that has the magnetically orientable pigment dispersed therein.

The composition is then coated on a suitable substrate, and while it is still soft enough that the magnetically orientable pigment can be moved, it is subjected to curved magnetic fields. These magnetic fields orientate the magnetically orientable pigment along the lines of force of the magnetic field. While such pigment is in an orientated position, the composition is allowed to harden. The result is a hard film adhered to the substrate that contains the above-mentioned pigment orientated along the lines of force of the applied magnetic field. If a free film is desired, it can be made by any suitable technique, such as casting, molding, extruding or coating on a substrate from which the film can be removed.

The curved magnetic fields can be obtained by any suitable method. A single magnet can be used, or a plurality of magnets can be used that are arranged preferably so that opposite poles are adjacent to each other. As well as this, magnetizable metal of various shapes can be placed over the pole of a magnet or the poles of a plurality of magnets to produce curved lines of force in various patterns. For example, a piece of sheet steel cut in a star shape can be placed over a magnet or plurality of magnets. Or the surface of a steel sheet can be cut, machined, etched, etc. into ridges, valleys, grooves or other relief configurations and then this sheet can be placed in contact with a magnet or plurality of magnets, and the relief surface directed towards the film. Of course, if desired, an electromagnet or electromagnets can be used instead of or in conjunction with permanent magnets.

The curved magnetic fields can originate at any suitable location, so long as a curved field of the desired configuration passes through the film. For example, the field can originate below the film, above the film, to the side of the film or in a combination of of the foregoing. Preferably, the field is located below the film.

After the film has hardened the reference points can be placed in close proximity to the film. However, if the reference points are already incorporated in the film the providing of additional reference points will not be required.

The film can be adhered to any suitable substrate such as paper, cardboard, regenerated cellulose, cloth, earthenware, wood fabric, metal (ferrous and nonferrous such as steel, iron, aluminum, brass, bronze, etc.) plastic, leather, synthetic leather, polymer and the like.

Or if desired, the film itself can be used as decorative wrap, tile, coverings, panels, etc.

The invention will be understood more clearly by reference to the following examples. All parts and percentages are by weight unless otherwise specified.

EXAMPLE 1

An acrylic lacquer was made using standard techniques and having 35 percent solids in solution in a solvent mixtures of ketones, esters and aromatics. The following was the composition of the solids in the acrylic lacquer:

| Ingredient | Parts |
| --- | --- |
| polymethyl methacrylate | 18.4 |
| copolymer of 99% methyl methacrylate and 1% 2-diethylaminoethyl methacrylate | 10.0 |
| copolymer of 18% butyl acrylate and 82% methyl methacrylate | 28.4 |
| 35% coconut oil alkyd | 21.0 |
| cellulose acetate butyrate | 19.9 |
| ultraviolet screen | 2.0 |
| polybutyl acrylate | 0.3 |
| | 100.0 |

A paint containing magnetically orientable pigment was then made using standard techniques that had the following composition:

| Ingredient | Amount (grams) |
| --- | --- |
| acrylic lacquer (35% solids) | 200 |
| highly reflective nickel pigment produced* by vacuum deposition of nickel and having | |

-Continued

| Ingredient | Amount (grams) |
| --- | --- |
| a size of about 200 mesh | 0.75 |
| phthalo green mill base in acrylic lacquer vehicle | trace (sufficient to point a medium green color) |
| acrylic lacquer thinner (mixture of 22.5 parts acetone, 43.5 parts toluene, and 34.0 parts cellosolve acetate) | 200 |

*Such pigment can be produced according to the teaching of U.S. Pat. No. 2,839,378 (with the exception that the flake is made of nickel instead of aluminum). A suitable method, for example, of producing such pigment includes depositing nickel over release coated Mylar polyester film, scrubbing the deposited nickel in the presence of acetone to remove it, and agitating the nickel to reduce it to the desired size.

The paint was then sprayed over a white painted aluminum panel. Located about ¼ inch below the aluminum panel were two bar magnets, about ¼ inch apart. The poles of the two magnets were arranged to that opposite poles (north and south) were adjacent to each other and pointed toward the nonsprayed surface of the panel.

The paint was allowed to dry. The resulting painted panel contained a curved configuration (a hump) of large nickel flake pigment that appeared to be located well below the actual depth of the paint film thickness. The large nickel flake pigment, both orientated and nonorientated, provided reference points. These reference points provided the viewer with an awareness of the location of the film which greatly increased the illusion of depth of the paint film.

EXAMPLE 2

An acrylic paint was made using standard techniques having the following composition:

| Ingredient | Parts (grams) |
| --- | --- |
| acrylic lacquer (35% solids) of Example 1 | 286 |
| nickel flake pigment (fine flakes of about 325 mesh size, Alcan Metal Powder Co. "MD–750") | 3 |
| phthalo green pigment mill base in acrylic lacquer vehicle | trace (sufficient to give paint a medium green color) |
| acrylic lacquer thinner of Example 1 | 286 |

The resulting paint was sprayed over a white painted aluminum panel that had located under it the same magnet set-up described in Example 1.

After the paint had dried, the aluminum panel was spray painted again with another coat of paint having the following composition:

| Ingredient | Parts (grams) |
| --- | --- |
| acrylic lacquer (35% solids) of Example 1 | 286 |
| deep gold "Afflair" pigment* (nonmagnetically orientable) | 0.75 |
| acrylic lacquer thinner of Example 1 | 430 |

*Available from E. I. du Pont de Nemours & Co.

The resulting painted panel contained a curved configuration (a hump) of nickel flake pigment that appeared to be located well below the actual depth of the paint film thickness. The relatively large gold flake pigment in the top coat provided reference points which provided the viewer with an awareness of the location of the film. This greatly accentuated the appearance of depth in the film.

EXAMPLE 3

A paint containing magnetically orientable pigment was made using standard techniques that had the following composition:

| Ingredient | Parts (grams) |
| --- | --- |
| acrylic lacquer of Example 1 except having 17.5% solids | 400 |
| "MD–750" nickel flakes of Example 2, 325 mesh size | 5 |
| mill base of hydrous iron oxide in acrylic lacquer | 120 (sufficient to give paint a medium gold-brown color) |

The resulting paint was sprayed over a pebble surfaced fiber board that had been painted brown. The fiber board had below it the magnet set-up described in Example 1.

After drying of the paint the resulting painted panel appeared to contain a curved configuration (a hump) that appeared to be located well below the actual depth of the paint film thickness. The pebble surface of the fiber board and the pebble surface of the film adhered thereto provided reference points which provided the viewer with an awareness of the location of the film. This greatly accentuated the appearance of depth in the paint film.

EXAMPLE 4

A paint containing magnetically orientable pigment was made using standard techniques which had the following composition:

| Ingredient | Parts (grams) |
| --- | --- |
| polymer solution having 59% solids* | 162 |
| cellulose acetate butyrate | 18 |
| "MD–750" nickel flakes of Example 2, 325 mesh size | 30 |

*The film-forming polymer comprises a polymer having a backbone of ethylenically unsaturated monomers having pendant carboxyl groups attached to the backbone, some of the active hydrogens of the carboxy groups being replaced by ester groups, the ester groups being 5–95 percent of the total weight of the polymer. The lacquer (and film-forming polymer) is produced according to the teaching of Vasta U.S. Pat. No. 3,366,706 issued Jan. 30, 1968, the disclosure of which is hereby incorporated by reference.

The resulting paint was applied by roller coating (at about 0.4 mil dry film thickness) over a tin-plated steel panel (normal tin-can stock) that had previously been painted with a transparent blue enamel.

The underside of the wet panel was immediately placed in contact with the magnet set-up described in Example 1 followed by bake at about 200°F. for about 2 seconds.

The panel was then removed from the magnets and baked at about 300°F. for about 15 minutes. Afterwards, black letters were printed on the panel with a silk screen stencil.

The resulting panel appeared to contain a curved configuration (a hump) of nickel flake pigment that appeared to be located well below the actual depth of the paint film thickness. The printed black letters provided reference points which provided the viewer with an awareness of the location of the film. This greatly accentuated the appearance of depth in the paint film.

The invention claimed is:

1. A decorative film comprising a pigmented film of film-forming material containing magnetically orientable pigment that is oriented in curved configurations, such pigmented film produced by (i) providing a soft film of film-forming material containing 0.1 percent to 95 percent (by weight of the film) of magnetically orientable pigment, (ii) subjecting the soft film to curved magnetic fields, thereby orientating the pigment in curved configurations, and (iii) hardening the film, and reference points on the surface of the film, such reference points being printing on the top surface of the film, writing on the top surface of the film, splattering of paint or dusting of paint on the top surface of the film, topcoat containing visible particles on the top surface of the film, visible particles in the film, visible particles on the film or combinations of the foregoing.

2. The film of claim 1 wherein the pigment is metallic.

3. The film of claim 2 wherein the pigment is in the form of flakes, plates or needles.

4. The film of claim 1 wherein the film-forming material is polymer.

5. The film of claim 1 wherein the film-forming material is polymer formed from the addition polymerization of ethylenically unsaturated monomers.

6. The film of claim 5 wherein the polymer is formed from the addition polymerizaton of ethylenically unsaturated monomers selected from the group consisting of acrylic acid, methacrylic acid, esters of acrylic acid or methacrylic acid with alkanols of 1–20 carbon atoms, of dimethyl or diethyl aminoethyl methacrylate.

7. The film of claim 1 wherein the film-forming material is glass.

8. The film of claim 1 wherein the reference points are visible particles which comprise flakes of highly reflective nickel pigment produced by the vacuum deposition of nickel.

9. The film of claim 1 adhered to a suitable substrate.

10. A method of producing a decorative, pigmented film comprising:
   a. providing a soft film of film-forming material containing 0.1 percent to 95 percent (by weight of the film) of magnetically orientable pigment,
   b. subjecting the soft film to curved magnetic fields, thereby orienting the pigment in curved configurations,
   c. hardening the film, and
   d. providing reference points for the film, such reference points being printing on the top surface of the film, writing on the top surface of the film, splattering of paint or dusting of paint on the top surface of the film, topcoat containing visible particles on the top surface of the film, visible particles in the film, visible particles on the film or combinations of the foregoing.

* * * * *